Patented Jan. 6, 1948

2,434,230

UNITED STATES PATENT OFFICE 2,434,230

METHOD OF PREPARING 1.3.5.TRINITRO HEXAHYDRO S-TRIAZINE

Robert Walter Schiessler, State College, Pa., and James Hamilton Ross, Montreal, Quebec, Canada No Drawing. Application May 23, 1942, Serial No. 444,254. In Canada May 19, 1942

9 Claims. (Cl. 260—248)

1

This invention relates to cyclonite and more particularly to a method of preparing it.

Cyclonite, sometimes known as hexagen, is 1.3.5.trinitro hexahydro s-triazine and is a powerful explosive material. The object of the present invention is to provide a convenient and improved method of preparing the material.

In accordance with the invention formaldehyde is caused to react on ammonium nitrate with the elimination of the constituents of water at a temperature below 100° C. While the presently preferred procedure is as hereinafter described it will be apparent that the basic procedure is as indicated and that the formaldehyde may be formed in situ, that is to say, from any compound which on normal hydrolysis or depolymerization yields the active methylene group of formaldehyde, or from a compound having a methylene diamine grouping, which in simple form may be methylene diacetamide. Ammonium nitrate may be treated with paraformaldehyde in the presence of acetic anhydride. While stirring the mixture is held at a temperature below 100° C. Upon addition of water to give a solution of acetic acid of about 50 to 60%, a precipitate forms and this is redissolved by heating. Cooling the solution yields material of desired granulation and purity. It is washed with water and further purified by boiling in water.

The following example is given as illustrative of the detail procedure, but it is to be understood that the invention is not limited to the specific details given.

A mixture of 16 grams (0.20 mole) of ammonium nitrate and 3 grams (0.1 mole) of paraformaldehyde of low melting point, is added slowly to 27 grams (25 cc. or 0.27 mole) of acetic anhydride heated to 60 to 85° C. in a suitable vessel equipped with a mechanical stirrer. Sometime, fifteen to sixty minutes, after the final addition of the ammonium nitrate paraformaldehyde mixture, 15 to 30 cc. of water is added, a precipitate forms and the mixture is heated to dissolve the precipitate. Upon cooling the solution, the product is filtered off and washed with water.

Highest yields were obtained by regulating the temperature not to exceed 100° C. Preferred proportions are at least 1.25 moles of ammonium nitrate per mole of paraformaldehyde and about 2.7 moles of acetic anhydride. A yield of 1 part of cyclonite per part of paraformaldehyde was obtained. The acetic anhydride may be recovered as acetic acid.

While various operating details of the method have been described, the invention is to be limited in scope only by the appended claims.

We claim:

1. In the production of the explosive cyclonite, the method which comprises reacting ammonium nitrate and paraformaldehyde in the presence of acetic anhydride.

2. A method of producing 1.3.5.trinitro hexahydro s-triazine which comprises heating ammonium nitrate and paraformaldehyde in the presence of acetic anhydride.

3. A method of producing 1.3.5.trinitro hexahydro s-triazine which comprises slowly raising the temperature of a mixture of ammonium nitrate, paraformaldehyde and acetic anhydride to a temperature not exceeding 100° C. while stirring the mixture.

4. A method as defined in claim 2 wherein the reaction mixture contains at least 1.25 moles of ammonium nitrate per mole of paraformaldehyde.

5. A method as defined in claim 2 wherein the reaction mixture contains about 2.7 moles of acetic anhydride per mole of paraformaldehyde.

6. A method as defined in claim 3 wherein the reaction mixture contains at least 1.25 moles of ammonium nitrate and about 2.7 moles of acetic anhydride per mole of paraformaldehyde.

7. A method of preparing cyclonite which comprises stirring a mixture of ammonium nitrate, paraformaldehyde and acetic anhydride, heating the mixture to a temperature not exceeding 100° C. and adding water to form a precipitate.

8. A method as defined in claim 7 wherein the mixture is heated to dissolve the precipitate, then cooled to form a precipitate which is separated and washed.

9. A method of producing the explosive cyclonite which comprises reacting ammonium nitrate in the presence of acetic anhydride and at a temperature below 100° C. with a compound which releases in situ in the reaction the active methylene group =CH₂ of formaldehyde and recovering the cyclonite.

ROBERT WALTER SCHIESSLER.
JAMES HAMILTON ROSS.